United States Patent Office 3,441,343
Patented Apr. 29, 1969

3,441,343
CARTOON ANIMATION PROCESS
Claude Piron, Nantes, and Ragnar Van Leyden, Paris, France, assignors of one-third to Omnium Technique d'Etudes et Realisations (OTER), Nantes, Loire- Atlantique, France
Filed July 21, 1965, Ser. No. 473,611
Claims priority, application France, July 29, 1964, 983,534
Int. Cl. G03b *19/18*
U.S. Cl. 352—87  2 Claims

ABSTRACT OF THE DISCLOSURE

Apparatus for producing cartoon animation film comprising a camera facing a reflective screen formed of a plurality of small orientable reflecting elements, said screen facing a color panel, and a control panel having means for orienting said reflecting elements so as to reflect a desired portion of said color panel to produce colored light point images for recording by said camera.

---

This invention relates to a cartoon animation process applicable more particularly to the production of animated films, and to apparatus for performing the same or a similar process.

The most usual method of making animated films is to make a series of drawings (and colour the same if the film is a colour film), the drawings differing only in respect of the positions occupied successively by the part or parts of the drawing which are to appear animated on projection. The successive drawings are then photographed on a film which will be the negative strip.

These operations, particularly the colouring of each drawing and the photographing of successive drawings, require a considerable amount of time. Consequently, the production of an animated film requires a very large staff for a very long time which may be as much as 9 months for a film lasting seven minutes.

The present invention relates to a cartoon animation process which reduces the number of operations required for the production of an animated film and hence reduces the cost of production of such a film in proportion.

To this end, the process according to the invention comprises the production of beams of light, the reflection of these beams from reflecting surfaces so orientated that they either do or do not product an image on the sensitive surface of a recording camera, the recording of the drawing formed by all the images, the conversion of this initial drawing into successive drawings which differ from the initial drawing, by modification of the light images, and recording of these successive drawings.

This process can be used for the production of animated black and white or colour films provided that coloured beams of light are used.

Before a drawing is recorded it is first displayed to enable the correction of the image to be checked, and it is then stored; recording is then carried out either intermittently or continuously.

The process enables animated cartoons to be produced much more quickly and much more simply than with the prior art processes while it also enables some operations, e.g. instantaneous erasure of all or some of the drawing, to be readily carried out. The process also permits instantaneous change of one or more colours of all or part of the drawing.

The production of animated cartoon films is not the only application of the process, which may also be used for the production of advertisement hoardings or synoptic tableaux.

The invention also relates to apparatus for performing the process, such apparatus comprising at least one coloured light source disposed in register with a plurality of small orientable elemental reflecting surfaces, a control panel for the light sources and for orientation of the reflecting surfaces, a memory system for the drawings formed by all the images given by the reflecting surfaces, and a recording system for the drawings obtained.

The invention also comprises other features which can be used with the foregoing or independently thereof. All these features will be apparent from the following description of one embodiment of the invention which is given by way of example with reference to the accompanying drawings, wherein.

Figure 1:
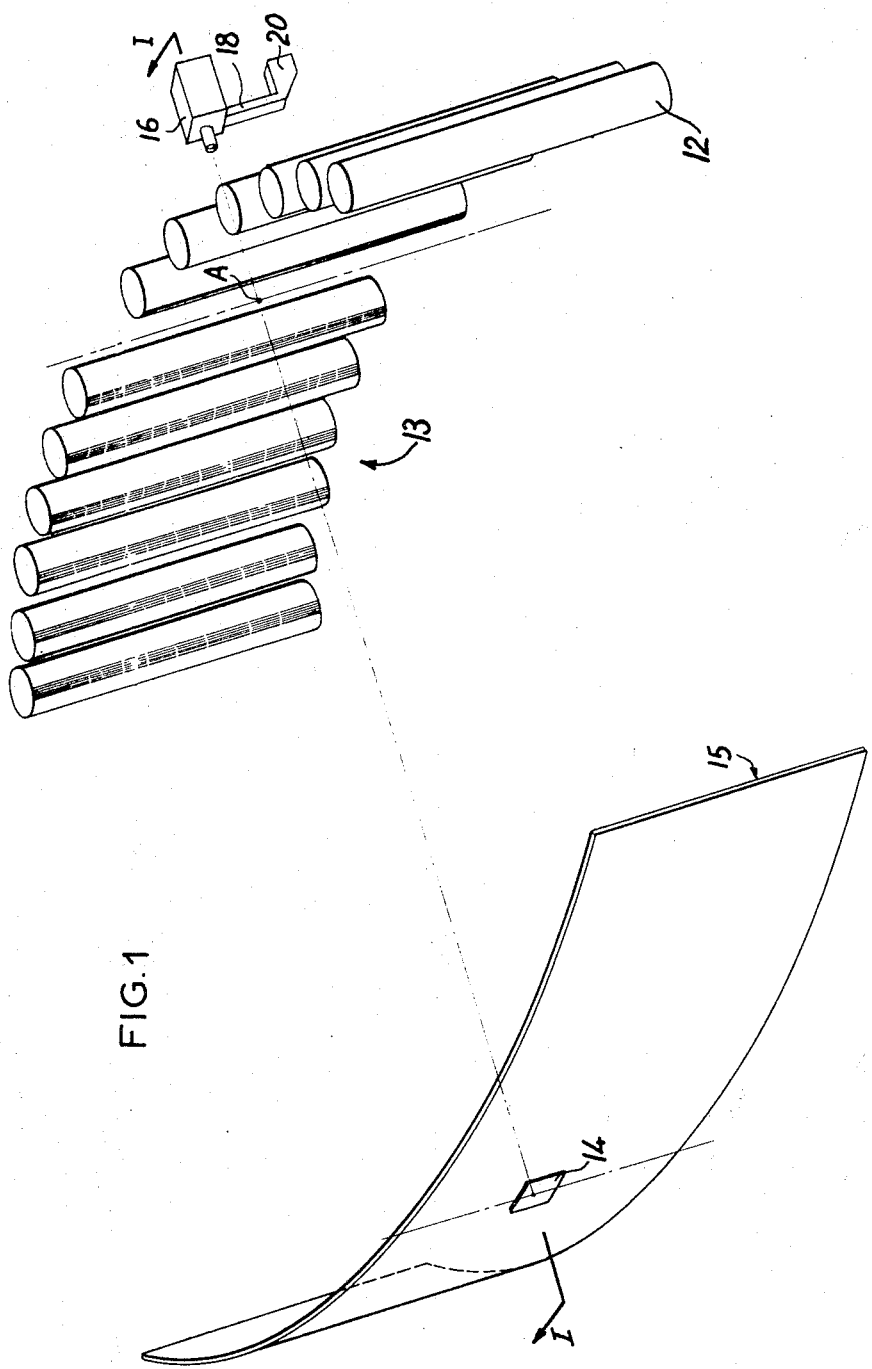
FIGURE 1 is a diagrammatic perspective view of the apparatus.

The apparatus shown in FIG. 1 comprises a plurality of light sources, e.g. 12, forming a colour panel 13.

These sources are in the form of drums illuminated axially by a bank of lights and whose colouring is provided by an external film of coloured plastics. The drums 12 may be replaced by other light sources, for example in the form of ordinary coloured strips. A detailed description of these drums 12 will be given hereinafter.

The elemental reflecting surfaces are formed by small mirrors, e.g. 14, for example squares having a 7 mm. side; these mirrors are juxtaposed and the system forms a mirror panel 15 curved along the arc of a cylinder disposed opposite the colour panel 13. One form of apparatus constructed comprised a mirror panel containing 164 square mirrors of a 7 mm. side and a colour panel formed by 24 coloured drums 12. To obtain a better definition of the overall image given by these mirrors, the number of reflecting surfaces may be increased. Each mirror is oriented by means of a control device which will be described hereinafter.

The mirror panel 15 and hence the colour panel 13 are inclined to the vertical, such inclination being due to the geometry of the mirror control systems. However, other control systems would be possible to enable the mirror panel 15 to be disposed vertically.

The axis of the cylinder forming the envelope of the mirror panel 15 embodies the points of convergence of each of the normals to the mirrors and the viewing centre A is disposed on this axis at half the height of the mirror panel. The drums 12 making up the colour panel 13 are distributed over a cylindrical envelope passing through the axis of the mirror panel envelope.

The images of the light sources 12 reflected by the mirrors 14 are focussed at the viewing centre by a pair of lens elements 17 (FIG. 2) in the objective of a camera 16 which is used as the recording system. This camera 16 comprises a reflex viewer to which is connected an optical duct 18 to give an image of the drawing formed by the mirror panel 15 on a screen 20.

Figure 3:
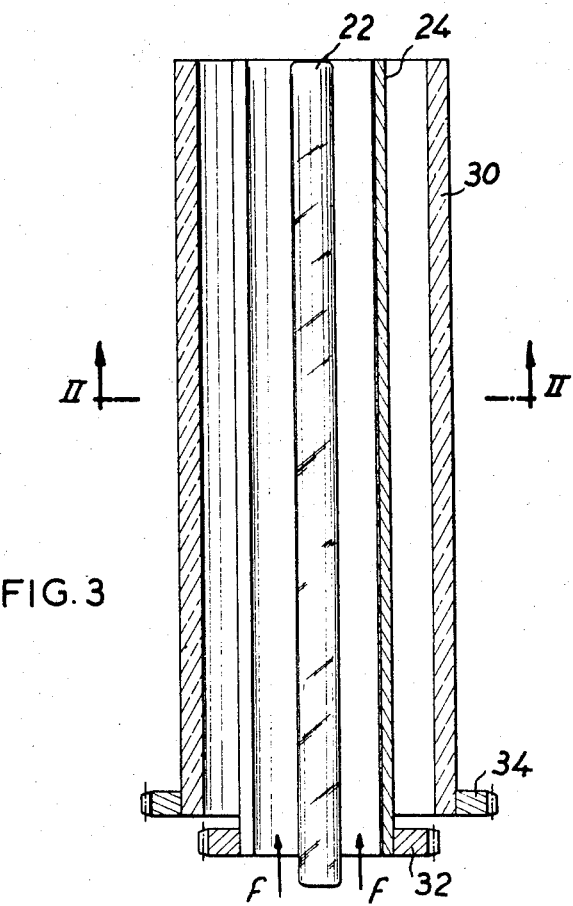
FIGURE 3 is a section of a light source taken along its axis.
Figure 4:
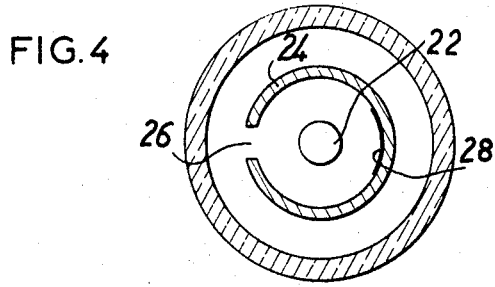
FIGURE 4 shows a light source in section on the line II–II in FIG. 3.

With reference to FIGS. 3 and 4, the light sources 12 comprise successively in the outward direction a bank of lights 22, an annular wall 24 formed with a slot 26 acting as a shutter, the slot 26 being disposed in register with a reflective coating 28 on the wall 24, and finally on the outside, a transparent wall 30 covered, for example, by the material having the trade name "Plexiglas". The Plexiglas is coloured; to obtain a plurality of colours on the drum the outer casing 30 is made by superimposing three transparent sheets in the three primary colours interconnected along long bevelled edges which enable graduations to be obtained from one colour to the next.

An effective ventilation system giving an air stream in the direction of the arrows f acts inside the drum 12 to prevent any heating from the light source. The wall 24 is movable and can rotate on itself by means of a gear 32 driven by a motor (not shown). During such rotation slot 26 can direct the beam of light on to the mirror panel 15 or alternatively be made to shut the light out; similarly, the outer wall 30 is also movable and can rotate on itself by means of a gear 34 driven by a motor (not shown).

Each drum 12 can thus rotate about its axis to as many positions as it contains colours; also, the drums 12 are interchangeable thus multiplying the number of usable colours.

Figure 5:
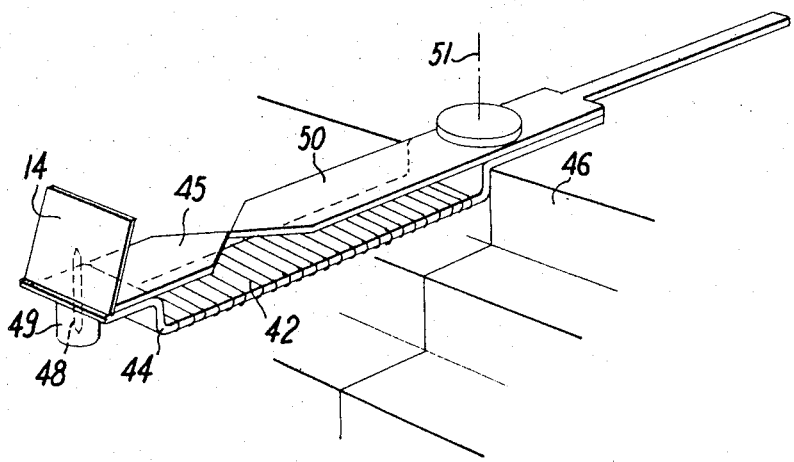
FIGURE 5 is a detail of the orientation device for a reflecting surface.
Figure 6:
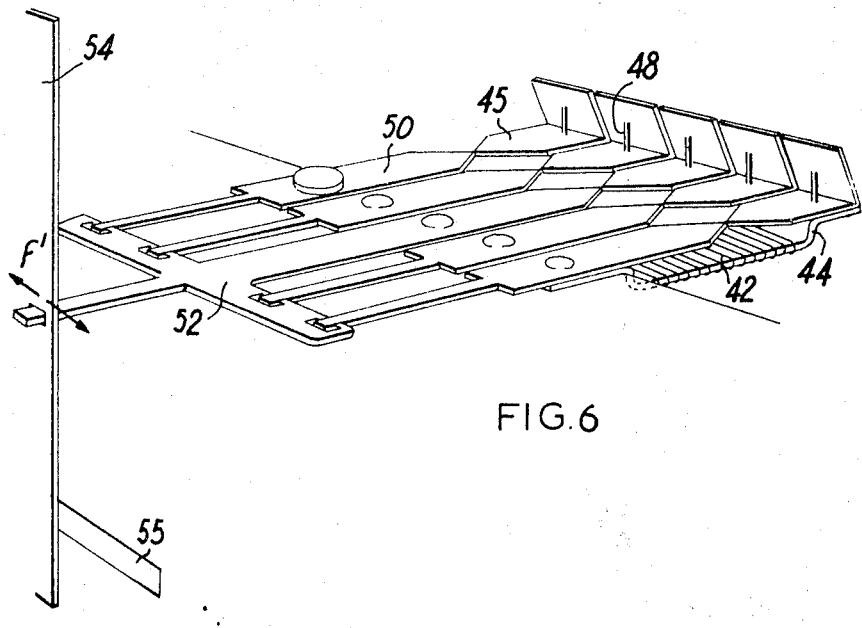
FIGURE 6 shows a device enabling five reflecting surfaces to be connected.

The mirrors 14 are oriented by means of a mechanism of the type shown in FIGS. 5 and 6. The mirror orientation principle is based on the well-known fact that a magnetic flux produced by energisation of a coil produces an attraction perpendicular to its direction.

A copper wire 42 representing the self-inductance is wound around a frame 44 one end of which is secured to a stepped base 46 matching the geometry of the mirror panel. The mirror 14 has a reflective surface deposited, for example, on a 3/10 folded steel strip which constitutes the mirror element 45 which resets by a pivot 48 in a step bearing 49 secured to the other end of the element 44. This construction is not limitative and any other orientation system could be used provided that it is very sensitive and of low inertia.

The mirror itself is either in the form of a thin layer of pure aluminium electrolytically deposited on the surface of the mirror element 45, or in the form of a glued or crimped glass.

The orientation of the mirror 14 is controlled by a pilot element 50 adapted to pivot about pivot 51 connected to the frame 44; one end of the pilot element 50 faces the mirror element 45 while its other end is connected to its drive mechanism.

Since the continuation of the axis of pivot 48 intersects the centre of the mirror, any pivoting of the element 50 causes the same rotation (except for a reduction of the angles) of the mirror without any displacement of its reflecting plane, thus reducing to a minimum the clearance between the mirrors.

The operation of the orientation control system for a mirror 14 will now be described.

The displacement of a pilot element 50 is controlled by the operator after selection of a drum 12 and hence after selection of a colour. This displacement is in the form of a rotation of the pilot element 50 about the pivot 51.

This rotation is produced by a connecting element 54 to which all the ends of the pilot elements 50 are connected. For simplification purposes, one pilot element out of every five is directly connected to the connecting element 54, the other four being connected to the same pilot as a result of the specific shape 52 shown in FIG. 6.

The connecting element 54 for the elements 52 is in the form of a rigid panel (FIG. 6) matching the curvature of the mirror panel 15. The movement of the connecting element 54 denoted by the arrows f' in FIG. 6, which is in the form of a rotation of very small amplitude, is guided by ball-bearings disposed in circular grooves (not shown). The control of this movement is transmitted to the connecting element 54 by a rod 55 connected to a driving element (not shown, because of conventional type).

When the pilot element 50 has pivoted about the pivot 51, energisation of the coil 42 produces a magnetic flux which flows through the pilot element 50 and attracts the mirror element 45 so that the points making up the ends of the pilot element 50 and the mirror element 45 are again in register with one another. After such movement, the mirror 14 connected to the mirror element 45 is in position for reflecting the light emitted by the selected colour drum 12.

Figure 7:
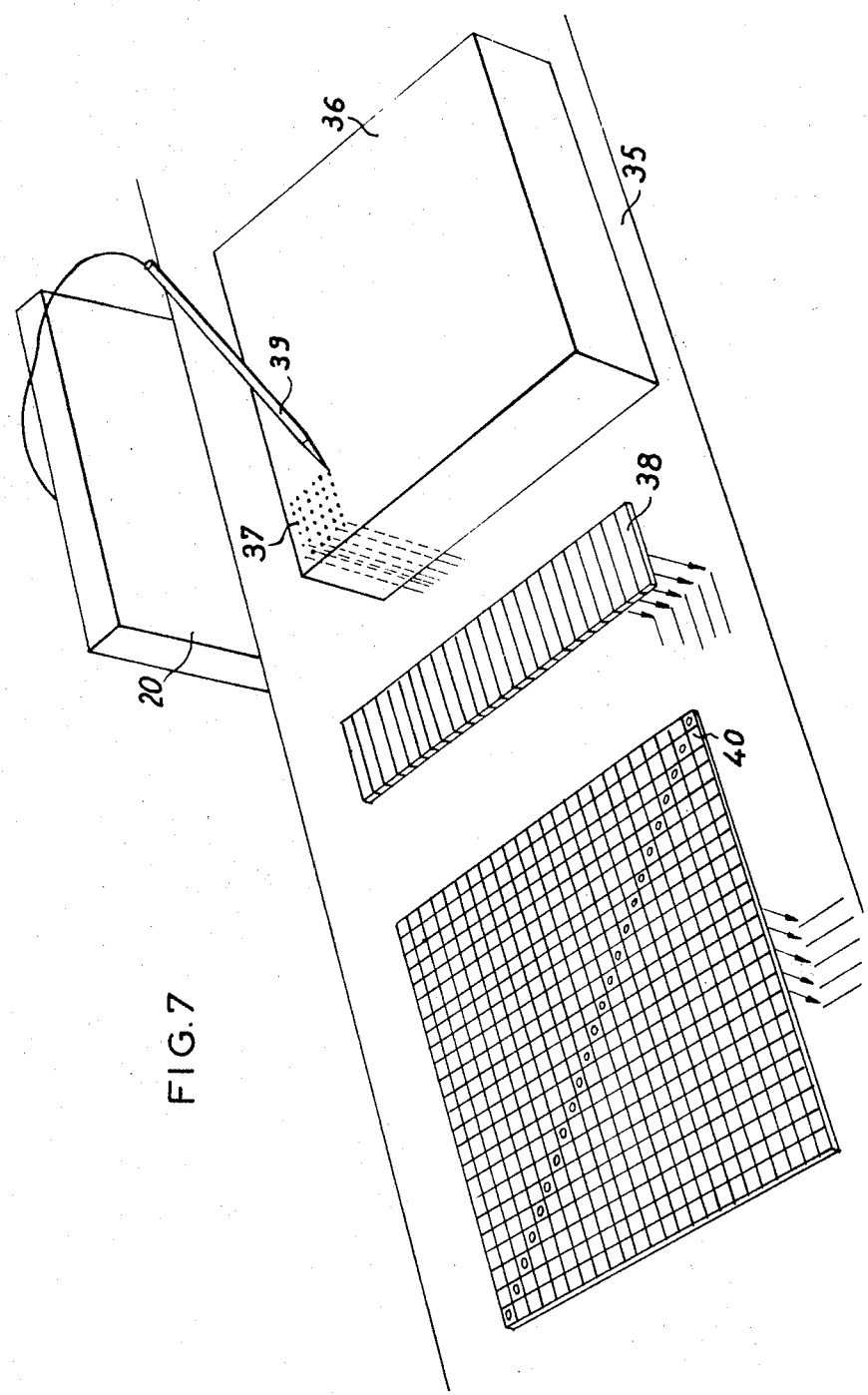
FIGURE 7 shows the control desk for the complete apparatus.

FIG. 7 shows the control panel 35 for producing the required patterns. This panel is in the form of a block 36 in which a number of copper needles 37, for example of a diameter of 1 mm., flush with the top surface are embedded, each needle corresponding to a mirror 14 of the mirror panel having the same coordinates. A colour keyboard 38 comprising as many keys as there are colours usable is disposed next to the control block 36. By way of example, in a practical embodiment of the apparatus the colour keyboard had 24 usable colours. Next to the colour keyboard 38 is the drum selector 40, which is made up of light keys arranged in a square, each vertical column containing as many keys as there are colours, i.e. 24 in the present case, and each horizontal line contains as many keys as there are drums, i.e. also 24.

Each horizontal line of this square is situated in line with a key of the colour keyboard 38. Hence each horizontal line has a single colour corresponding to that of the colour keybord 38. The normal colour of each drum is indicated on a diagonal of the square forming the drum selector 40; the term "normal colour" denotes the colour of a drum in its initial position.

Finally the apparatus comprises an electronic memory system so that the information from the control desk can be stored; this electronic system is quite conventional and not shown in the drawings.

Figure 2:
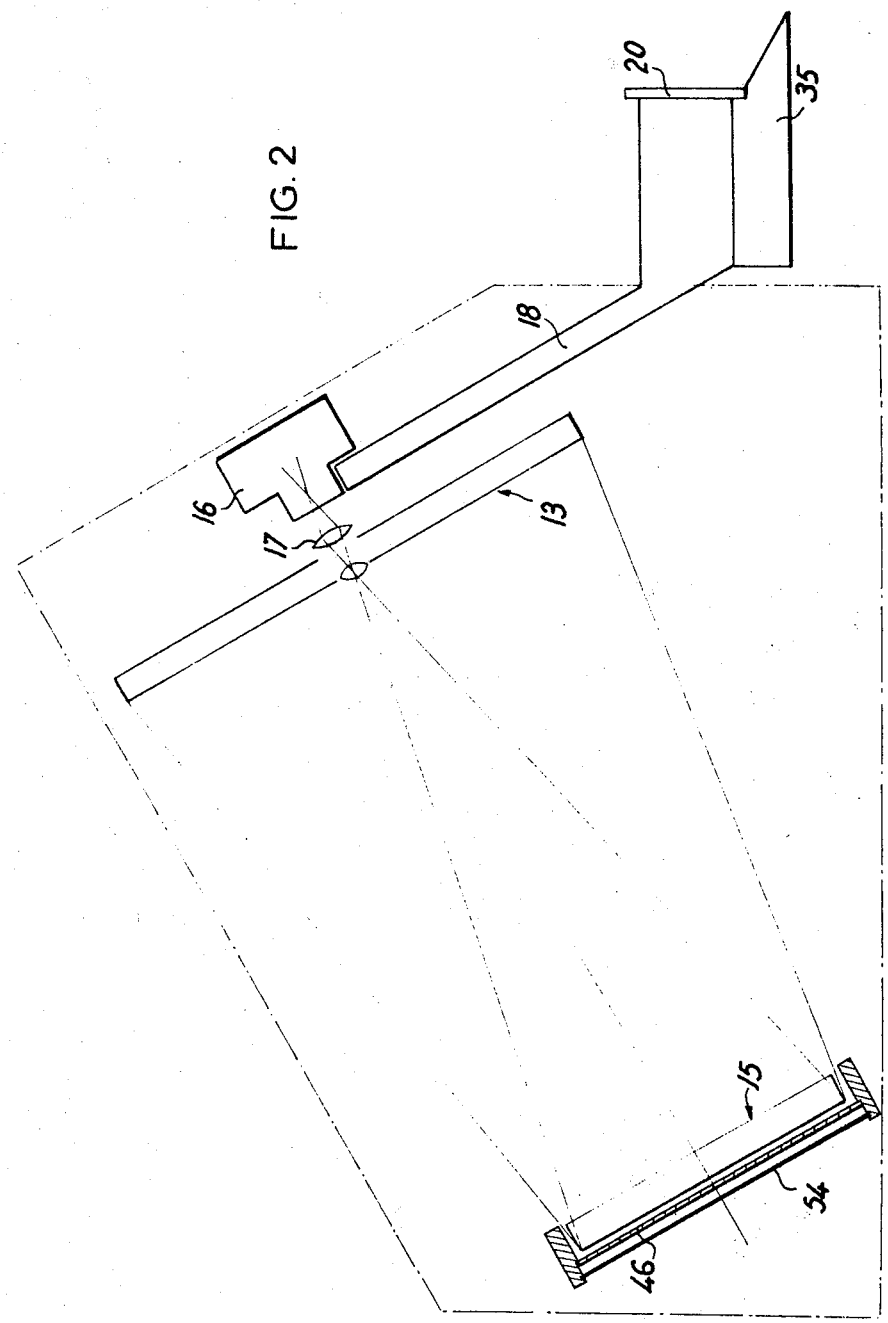
FIGURE 2 is a diagrammatic section of the apparatus on the line I–I in FIG. 1.

The complete apparatus, i.e., the colour panel 13, mirror panel 15, recording system 16 and control systems for the mirrors 14, is disposed inside a dark chamber shown in chain-lines in FIG. 2.

The colour panel system 13 comprising the drums 12 and mirror panel 15 is a preferred embodiment of the invention but is not in any way limiting and other arrangements of the light sources and reflecting surfaces would be possible. For example, it would be possible to use a number of flat coloured panels disposed opposite a mirror system making up a flat mirror panel.

Reflecting surfaces would also be possible with orientation being carried out by rotation of a pivot connected to such surface combined with a light source in the form of a ring of lights.

The operation of the apparatus is clear from the foregoing and will be described only briefly.

If the user wishes to change the colouring of part of a drawing, for example in order to produce a movement on the drawing, he will select a colour from the colour keyboard 38 and drum 12 from the drum selector 40; the pilot elements 50 at that time are all oriented in the same way in the direction of the selected drum 12, as a result of displacement of the connecting element 54. Only the mirrors selected by the operator from the control block 36 will be able to reflect the colour produced by the drum 12. This selection is carried out by means of a metal stylus 39 placed on the corresponding needle 37 of the control block 36. A metal blade enabling a plurality of mirrors to be selected simultaneously can be used instead of a stylus. Whenever the stylus passes to a needle 37 the coil 42 of the corresponding mirror is energised and the mirror turns to the colour selected.

The resultant change of the drawing is stored in the memory and then the operator makes modifications to the drawing corresponding to other colours in the same way. All the modifications stored in the memory are photographed and form the adjusted drawing.

To facilitate modification of a drawing and guide the operator's work, a blank drawing can be projected on the control block 36 by darkening the room and using a control block 36 of a light colour. By means of the stylus the operator will be able to reproduce the lines of the drawing by passing over the corresponding needles.

The modifications of the drawing appear on the screen 20 which enables the operator to follow his work and on completion of the latter the adjusted drawing is stored or else immediately photographed; projection of the various drawings at the required rate produces the animation.

The invention is obviously not limited to the embodiment which is given by way of example and the present invention naturally covers all applications and variants of all or some of the devices described coming under the heading of equivalent means.

We claim:

1. Apparatus for producing a cartoon animation film comprising a recording camera spaced from and facing a reflective screen, the surfaces of said screen being formed of a plurality of small orientatable reflecting elements, said screen being spaced from a color panel, with said reflecting elements facing said color panel, said color panel being formed of a plurality of elongated color elements, each of said elemental reflecting elements being angularly oriented, respectively by means of a control panel so as to reflect a desired portion of said color panel to said recording camera whereby an operator at the control panel may produce colored light point images on said reflective screen for recording by the camera and may change consecutively recorded images as desired by changing the orientation of the reflectors.

2. Apparatus as described in claim 1, said control panel comprising a block, copper needles embedded in and flush with the surface of said block, a copper needle being provided for each of said reflecting elements, a stylus, each of said needles when touched by said stylus controlling the orientation of said reflecting element having the same coordinates, a color keyboard, a key in said keyboard for each usable color, said elongated color elements being luminous colored bands, a color element selector, light keys for said selector disposed in a square, each column of said square corresponding to a color element and containing as many keys as there are colors, and said keys instantaneously modifying the normal colors for variation of some of the colors and animation of the colored surfaces, other surfaces having the same colors remaining motionless.

References Cited

UNITED STATES PATENTS

| 2,244,687 | 6/1941 | Goldsmith et al. | |
| 2,942,355 | 6/1960 | May et al. | |
| 3,259,040 | 7/1966 | Kumagai. | |
| 1,458,826 | 6/1923 | Janovjak | 352—41 |
| 2,201,649 | 5/1940 | Fleischer | 352—52 |

FOREIGN PATENTS

| 360,586 | 4/1962 | Switzerland. |
| 772,057 | 8/1934 | France. |
| 629,570 | 5/1936 | Germany. |
| 459,307 | 1/1937 | Great Britain. |

JULIA E. COINER, *Primary Examiner.*